Jan. 23, 1940.    G. A. LYON    2,187,946
APPARATUS FOR CONTROLLING FLOW OF AIR TO RADIATORS
Filed Dec. 8, 1936    5 Sheets-Sheet 1

Inventor
GEORGE ALBERT LYON.

Jan. 23, 1940.  G. A. LYON  2,187,946
APPARATUS FOR CONTROLLING FLOW OF AIR TO RADIATORS
Filed Dec. 8, 1936   5 Sheets-Sheet 5

Patented Jan. 23, 1940

2,187,946

UNITED STATES PATENT OFFICE 2,187,946

APPARATUS FOR CONTROLLING FLOW OF AIR TO RADIATORS

George Albert Lyon, Allenhurst, N. J.

Application December 8, 1936, Serial No. 114,798

32 Claims. (Cl. 180—69)

This invention relates to a method of and apparatus for controlling the flow of air to radiators, and more particularly to an arrangement which is especially suitable for use in conjunction with an automobile radiator.

Many arrangements have been proposed in the past for regulating or controlling the flow of air to radiators and particularly to automobile radiators. It is, of course, highly desirable in the design of automobile radiators to provide some type of baffle arrangement or other similar devices for reducing the amount of air which can flow to the radiator in the winter time than in the summer time. The most desirable arrangement for accomplishing this purpose would be some equipment which is inexpensive to construct, which is sturdy and reliable in use, which is entirely free from vibration when the automobile is in motion, and which efficiently effects the desired control of the flow of air to the vehicle radiator. It is an object of this invention to provide novel equipment possessing these highly desirable characteristics.

It is a further object of this invention to provide a novel apparatus controlling the flow of air to radiators which is economical to manufacture, which is rugged and reliable in use, and which may readily be mounted in front of an automobile radiator after the automobile has left the factory.

It is a still further object of this invention to provide a novel radiator accessory including a pair of shutters adapted to be disposed between the vehicle radiator and an ornamental radiator grille.

Another object of this invention is to provide a novel combination of vehicle radiator, grille, and air baffle plates.

Another and further object of the present invention is to provide a novel method for controlling the flow of air through a cooling radiator.

Another and still further object of this invention is to provide a novel means for effecting an opening and closing of a pair of radiator shutters.

A still further object of this invention is to provide a novel method of assembling and mounting an air baffle structure between a radiator and a radiator grille.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

Figure 1:
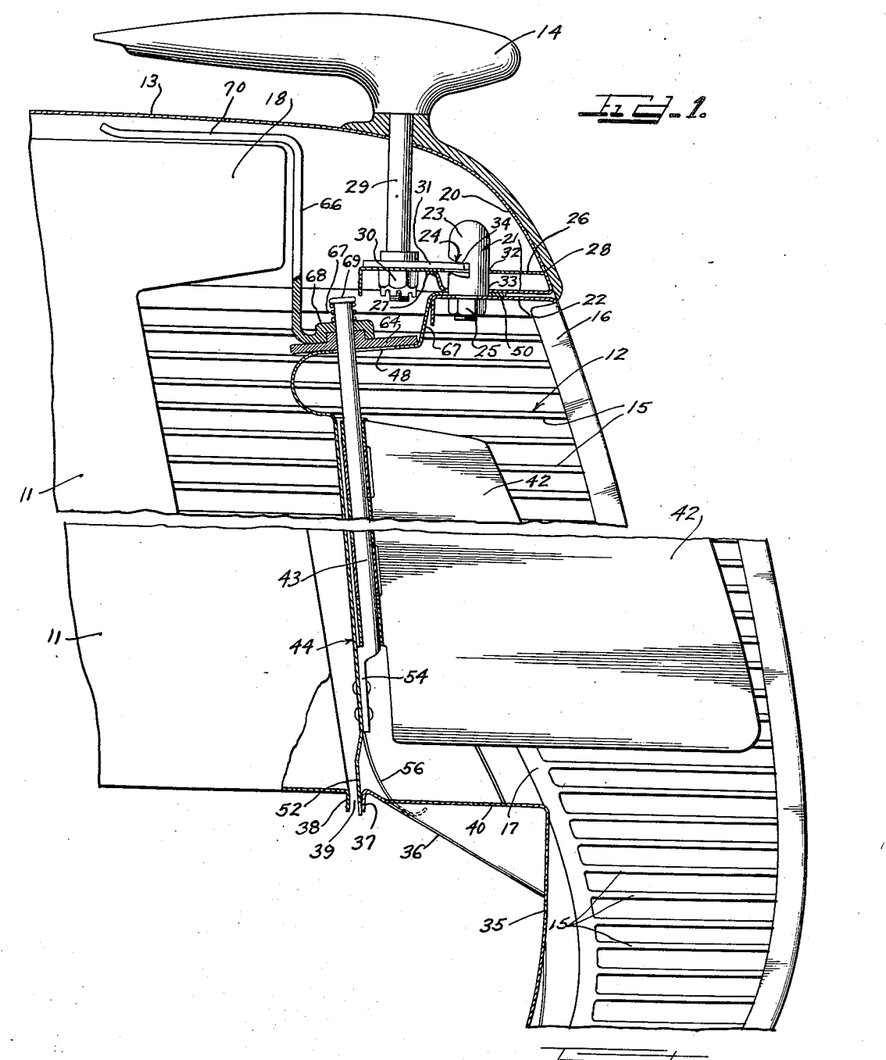
Figure 1 is a side elevational view partly in cross section showing one embodiment of my invention assembled between the cooling radiator of the automobile and the ornamental radiator grille.

In Figure 1 of the drawings, the front portion of an automobile 10 is illustrated, and includes in general a cooling radiator 11, an ornamental radiator grille 12, an engine hood 13, and a hood ornament 14. The particular design of ornamental radiator grille 12 may, of course, vary through wide ranges without departing from the spirit and scope of this invention, it being understood that this grille is merely for the purpose of ornamentation and is almost universally employed on automobiles today. As shown, radiator grille 12 includes a large number of horizontally disposed bars 15 which are secured together in desired spaced relationship at the front of the automobile by means of a flange 16 and at the rear by a flange 17. Bars 15 extend outwardly and rearwardly from front flange 16. Radiator grille 12 may be conveniently made up of two complementary halves which have their front flanges 16 secured together in any suitable manner such as welding or riveting (not shown).

Cooling radiator 11 may be of any construction such for example as the commonly employed honeycomb radiator, and includes a header 18 which extends at a substantial distance into the space between radiator 11 and grille 12. Particular note should be taken at this time that due to the fact that header 18 extends out a substantial distance into the space between radiator 11 and grille 12 only a relatively small opening is left between header 18 and the opening defining edge 19 (see Figure 13) when hood 13 is raised. Although in order to prevent undue multiplicity of drawings the entire automobile construction has not been illustrated, it is to be understood that hood 13 is of the type which is pivotally mounted at the rear and adapted to have its front portion raised. A suitable clamping or locking mechanism must of course be provided to secure hood 13 in its closed position. As shown in Figure 1, the front nose 20 of hood 13 is underturned as at 21 to form a flange for engaging the upper part 22 of grille 12. Secured centrally to the top of upper part 22 of grille 12 is a locking stud 23 which has a slot 24 therein adapted to receive the locking arm or cam of the hood 13. Locking stud 23 may be secured to grille 12 in any suitable manner such for example as by means of a nut 25, the lower portion of stud 23 being appropriately threaded therefor.

The nose 20 of hood 13 is reinforced by a flange or shelf 26 which extends across the inner portion of the nose in spaced relationship to flange 21. Flange or shelf 26 may be secured to hood 13 in any suitable manner such as by welding it at points 27 and 28. The locking mechanism of hood 13 is mounted on shelf 26 to a stud shaft 29 which is rigidly secured to ornament 14 and which rotatably extends through hood 13 and shelf 26. Ornament 14 and stud shaft 29 are held in desired position by means of a lock nut 30 which is threaded on the lower end of shaft 29. Rigidly secured to shaft 29, such as by means of a key (not shown), is an eccentrically mounted disk 31, which is adapted to extend into locking engagement with slot 24 of locking stud 23 as shown in Figure 1 of the drawings. Shelf 26 and underturned flange 21 of hood 13 are apertured at 32 and 33 respectively to receive stud 23.

From the above description it will readily be understood that by grasping ornament 14 and rotating it through an angle of substantially 90° locking cam 31 will be rotated out of locking engagement with stud 23 and the hood 13 may then be raised. To lock hood 13 in its closed position it is simply necessary to rotate ornament 14 to bring locking cam 31 back into engagement with slot 24 and stud 23. By providing slot 24 with a cross-sectional configuration such as that shown in Figure 1 of the drawings, it will readily be understood that locking cam 31 first engages the higher outer portion of slot 24, and then as cam 31 is moved further into slot 24 the surface of cam 31 rides down the slanting curved surface 34 thus bringing hood 13 into very tight engagement with the top of ornamental grille 12.

Referring now to the lower portion of Figure 1 of the drawings, it will be seen that grille 12 is provided with an interior portion which extends first upwardly from the lowermost portion of the grille as at 35 and then rearwardly and upwardly as at 36. The rear edge of rearwardly extending flange 36 is turned downwardly as at 37 in close proximity to the base flange 38 of cooling radiator 11. Particular note should be taken that lip 37 of flange 36 does not engage portion 38 of radiator 11 but rather leaves a channel 39 therebetween. As may be seen best in Figure 7 of the drawings, the center portion of rearwardly extending flange 36 is bent gradually upwardly to form a hill-like ridge 40. Hill-like ridge 40 of flange 36 thus extends forwardly from radiator 11 and substantially centrally thereof.

An adjustable air baffle structure or winter front for the above structure which may be removably mounted between cooling radiator 11 and grille 12 will now be described. In the design of a removable winter front for an automobile construction of the above referred to type it is, of course, necessary to provide an arrangement which can be collapsed into a small enough unit to be inserted through the very small openings between the radiator and the grille, which will effectively control the flow of inrushing air to the radiator, which will be inexpensive to manufacture, and which will be sturdy and free from vibration in use. A structure which possesses these characteristics and which is built in accordance with the teachings of the present invention is illustrated particularly in Figures 2 and 3 of the drawings. The air baffle structure or winter front includes a pair of baffle plates or fins 41 and 42 which are pivotally mounted on a pintle 43. Pintle 43 is carried on a stationary member 44 which includes a trough-like or channel upper portion 45 and a relatively flat lower portion 46. The upper part of stationary member 44 terminates in an irregularly shaped arm 47 which includes an intermediate horizontal portion 48 which is provided with a longitudinal slot 49 through which pintle 43 extends. The outer end 50 of arm 47 is provided with an aperture 51 which is adapted to receive locking stud 23 of grille structure 24 when the air baffle structure is disposed in desired position in the automobile construction as will presently be described.

The lower portion of stationary member 44 terminates in a downwardly extending lip or flange 52 which is adapted to be disposed in the channel 39 between lip 37 of flange 36 of grille 12 and lip 38 of radiator 11. The lower portion of pintle 43 is secured to stationary member 44 in any suitable manner such as by means of rivets 53, the lower end of pintle 43 being flattened out for that purpose as at 54 (see Figure 7). Secured on opposite sides of lower end 54 of pintle 43 to stationary member 44 are two spring fingers 55 and 56. The lower ends of spring fingers 55 and 56 are curled upwardly as at 57 and 58. As will presently be explained spring fingers 55 and 56 are adapted to engage rearwardly extending flange 36 of grille 12 on opposite sides of ridge 40.

A spring 59 is wrapped around pintle 43 and the opposite ends 60 and 61 thereof extend into engagement with the baffle plates or fins 41 and 42 respectively. It will thus be understood that fins 41 and 42 are constantly being urged apart by means of spring 59. As will be seen best in Figures 4 and 5 the fins 41 and 42 engage the outer edges 62 and 63 of channel 45. It will thus be seen as pintle 43 is gradually moved away from the bottom of channel 45 the fins 41 and 42 are gradually spread further and further apart by means of spring 59. As shown in the full line position of Figure 4 the pintle 43 is disposed close to the base of channel 45 and fins 41 and 42 are held close together. As shown in the dotted line position of Figure 4 and the full line position of Figure 5 pintle 43 has moved part way out of channel 45 and as a result fins 41 and 42 have diverged to the position shown. In the dotted line position of Figure 5 pintle 43 is completely outside of channel 45 and as a result fins 42 and 43 are in substantially a single plane.

As will hereinafter be used the expression "open position" will be used to refer to the fins as shown in their full-line position in Figure 4, that is with fins 41 and 42 close together, and the expression "closed position" will be used to designate the position of fins 41 and 42 as they appear in their dotted line position of Figure 5, that is when fins 41 and 42 are substantially 180° apart. The reason for this particular terminology is that when fins 41 and 42 are close together the maximum amount of in-rushing air will pass to radiator 11 and when fins 41 and 42 are spread wide apart, the minimum amount of in-rushing air will pass through radiator 11.

From the above description it will readily be appreciated by those skilled in the art that an extraordinarily simple construction has been provided for effecting a movement of the baffle plates or fins 41 and 42. Thus by simply moving the upper end of pintle 43 in or out of channel 45 of stationary member 44 fins 41 and 42 may be moved from their fully open position to their fully closed position.

Figures 2, 3:
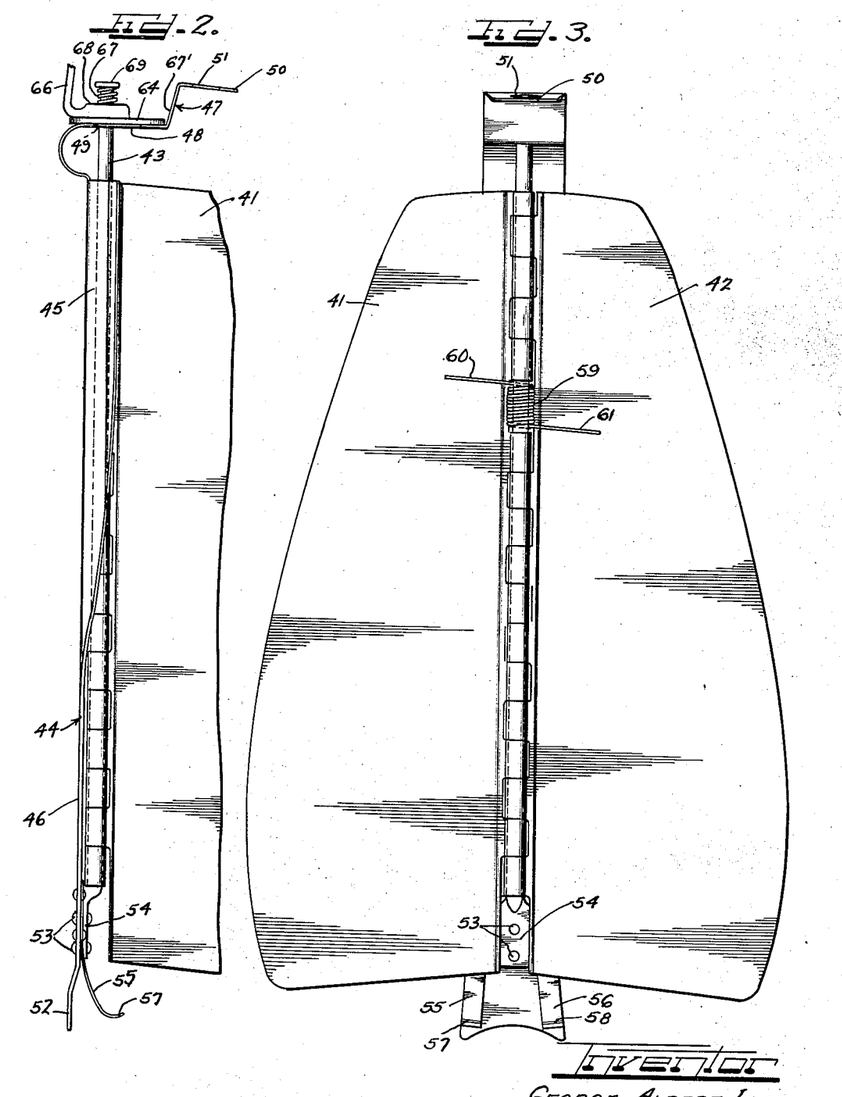
Figure 2 shows the accessory for the radiator as a unit, the fins being disposed together in their open position.
Figure 3 is a front elevational view of the radiator accessory showing the fins in closed position.
Figures 4, 5, 6, 7, 8:
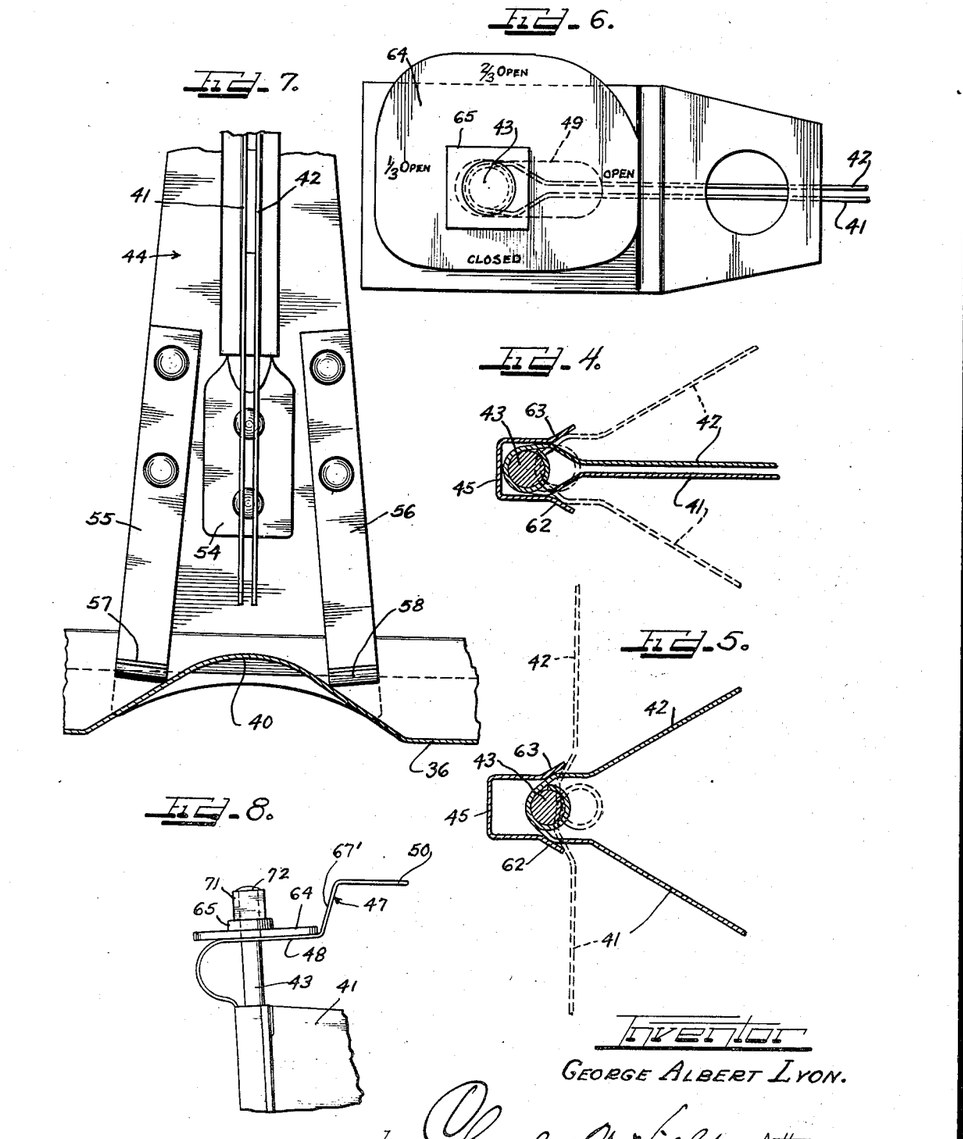
Figures 4 and 5 are cross-sectional views looking down on the top of the fins of the baffle plates, Figure 4 illustrating the fins in their open position and Figure 5 illustrating the fins in a partially closed position.
Figure 6 is a view illustrating the cam mechanism for controlling the position of the fins.
Figure 7 is an enlarged front view partly in cross section illustrating the lower portion of the baffle plate unit construction.
Figure 8 illustrates a slightly modified arrangement for effecting angular movement of the fins.

Referring now to Figures 2 and 6, one means for effecting movement of the upper end of pintle 43 will be described. Rotatably mounted on the upper end of pintle 43 immediately above the intermediate portion 48 of arm 47 is an eccentrically mounted rectangular cam 64 with rounded corners. Formed on the top of cam 64 is a square boss 65 which is adapted to engage cooperating lever arm or handle 66. A spring 67 biases the hub 68 of handle 66 into engagement with boss 65, the spring 67 being conveniently held in place by peening the outer end of pintle 43 as at 69. Cam 64 engages the upwardly extending portion 67' of arm 47 by reason of the slight resiliency of pintle 43. Upon a careful inspection of Figure 6 of the drawings it will be noted that each side of the cam 64 is a different distance from the axis of pintle 43. It will therefore be readily understood when the side of the cam which is marked "open" is in engagement with a portion 67' of arm 47 the pintle 43 is held furthest away from portion 67' and hence is retained in the bottom of channel 45 of stationary member 44. Thus in this position fins 41 and 42 are held in their "open position". When cam 64 is rotated thru substantially 90° in a clockwise direction so that the side of cam 64 which is marked "two-thirds open" engages portion 67' of arm 47 the upper end of pintle 43 is moved to the right in slot 49 of arm 47 approximately one-third of the way. This causes fins 41 and 42 to spread apart through some predetermined angle. Upon rotation of cam 64 through another 90° that portion of the cam which is marked "one-third open" moves into engagement with portion 67' of arm 47 and the upper end of pintle 43 is moved still further to the right in slot 49 or substantially two-thirds of the way. In this position of pintle 43, fins 41 and 42 have moved still further apart thus further increasing the barrier to in-rushing air. Upon still further movement of cam 64 through substantially 90° until that portion of the cam which is marked "closed" moves into engagement with portion 67' of arm 47 pintle 43 has moved over in slot 49 to its furthermost position to the right. In this position pintle 43 is substantially outside of channel 45 of stationary member 44 and as previously explained in this position fins 41 and 42 are substantially 180° apart.

Referring now to Figure 1 of the drawings the manner in which the air baffle structure is disposed between cooling radiator 11 and grille 12 may readily be seen and understood. The air baffle structure is so arranged that when fins 41 and 42 are in their open position they extend forwardly from pintle 43 to substantially the front of grille 12. Lip 52 of stationary member 44 extends downwardly into channel 39 behind lip 37 of rearwardly extending flange 36 of grille 12. Spring fingers 55 and 56 engage flange 36 on opposite sides of ridge 40, the springs being stretched to bias the structure upwardly and forwardly. Outer end 50 of arm 47 is hooked over locking stud 23 and is thus disposed between top part 22 of grille 12 and inturned flange 21 of hood 13 when the hood is in its closed and locked position. It will thus readily be understood that the hood 13 presses the air baffle structure downwardly against the resilient action of springs 55 and 56 and thus holds the air baffle structure firmly in desired position.

Operating handle 66 extends upwardly and then rearwardly in an end portion 70 which is disposed over the top of header 18 of radiator 11. Handle 66 is preferably made of slightly flexible material in order to facilitate the mounting of the air baffle structure in the narrow space between radiator 11 and grille 12 and in order to be forced around any obstructions which may be in its way. It will now readily be apparent why operating handle 66 cannot be rigidly secured to cam 64. End 70 of handle 66 cannot be left in a forward position or in a side position when hood 13 is closed. It is therefore always necessary after cam 64 has been rotated to its desired position to lift hub portion 68 of handle 66 upwardly out of engagement with boss 65 against the resilient action of spring 67 and then rotate handle 66 until end portion 70 extends over the top of header 18. Hub portion 68 is then lowered over boss 65 and the spring 67 maintains it thereagainst and prevents any rattling between these two elements of the structure.

In Figure 8 of the drawings a slightly modified arrangement is shown for effecting rotational movement of cam 64. In this particular arrangement the operating handle 66 and spring 67 is omitted and the boss 65 is provided with an extension 71 which is arranged to receive a lug wrench or some similar tool which may be conveniently used to rotate cam 64. Pintle 43 in this instance extends through boss 65 and the outer end is peened as at 72 to prevent cam 64 from sliding off the end of the pintle. In all other respects this modification of the invention is made exactly as described above in connection with the preferred embodiment of the invention.

Figures 9, 10:
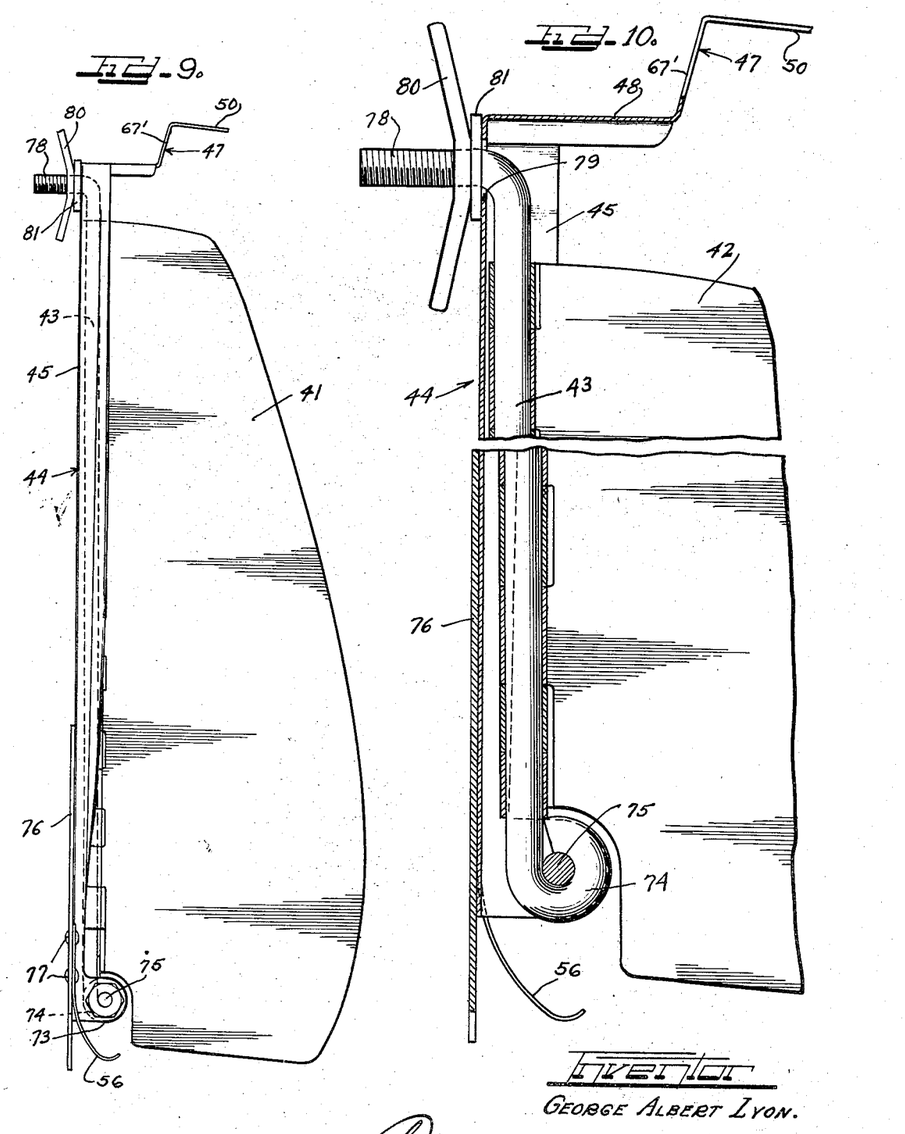
Figure 9 illustrates a modification of this invention.
Figure 10 is a greatly enlarged view partly in cross section of the modification as shown in Figure 9.

In Figures 9 and 10 a further embodiment of the invention is illustrated. In this arrangement the lower end of housing 44 instead of terminating in a downwardly extending lip terminates in a bearing collar 73 in which the lower end 74 of pintle 43 is pivotally mounted on a bolt or stud shaft 75. The baffle plates or fins 41 and 42 are mounted in a manner substantially similar to that described in connection with the preferred embodiment of the invention and cooperate in the same way with the channel portion 45 of stationary member 44. Inasmuch as the lower end of pintle 43 is pivotally mounted to the stationary member 44 rather than being rigidly mounted thereto, it is apparent that a pintle may be used which is neither yieldable nor flexible since the pivotal mounting will permit motion of the upper part of the pintle.

In order to provide a flange adapted to engage the lip 37 of grille 12 in channel 39 a plate 76 is welded or otherwise suitably secured to the back of stationary member 44. Spring fingers 55 and 56 are secured to plate 76 by means of rivets 77 or the like.

The upper end of pintle 43 has also been changed in this modification of the invention by providing it with a threaded rearwardly extending portion 78. Portion 78 of pintle 43 extends through a suitable aperture 79 in stationary member 44. A wing nut 80 and a washer 81 retain the end of pintle 43 in its desired position, it being remembered that the upper end of pintle 43 is constantly urged forwardly due to action of spring 59 which tries to force the inner end of fins 41 and 42 out of their cooperating channel 45. Thus by unscrewing wing nut 80 fins 41 and 42 may be moved from their open position to their closed position, that is to say from their position of parallelism to their position of being substantially 180° apart. In all other respects this modification of the invention is precisely the same as that described in connection with the preferred embodiment of the invention.

Attention is now directed to the particular shape of fins 41 and 42 as employed in each modification of the invention. The usual radiator front is substantially rectangular in shape. Since the coolest water in the radiator is generally near the bottom, fins 41 and 42 have been so shaped and designed that they present a greater barrier or obstruction near the bottom than near the top. In this manner greater quantities of air will flow through the top of the radiator than will flow through the bottom of the radiator irrespective of the angular position of fins 41 and 42. One shape of fin which has been found highly satisfactory is the shape indicated in the drawings. With fins of this shape the general appearance of the barrier in the fully closed position is that of a truncated heart. It is, of course, to be understood that when fins 41 and 42 are in their fully closed position this does not mean that no air passes through radiator 11. On the contrary it is highly desirable that some air be permitted to pass through radiator 11 at all times even in the coldest of weather and fins 41 and 42 have therefore been designed to meet this requirement.

Figure 11:
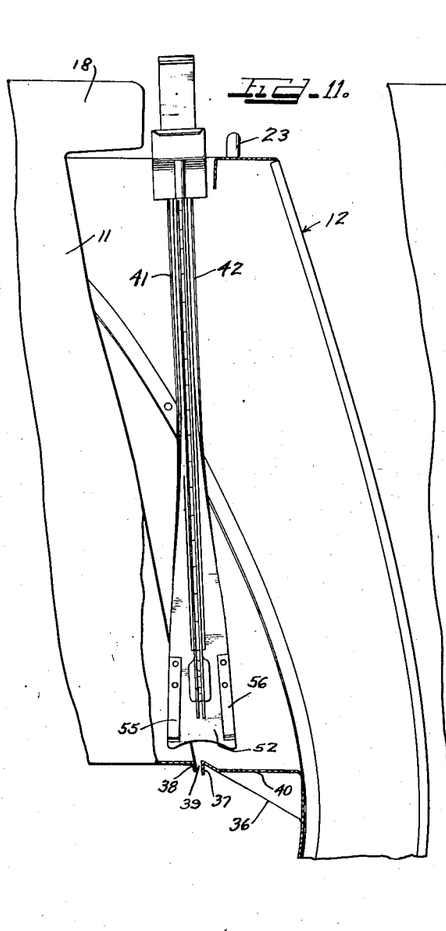
Figures 11, 12, and 13 illustrate the novel method of assembling air flow control units between a vehicle radiator and a radiator grille.
Figure 12:
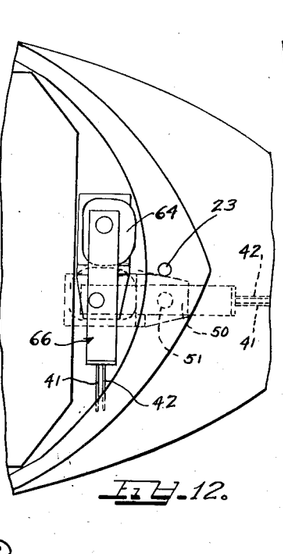
Figure 13:
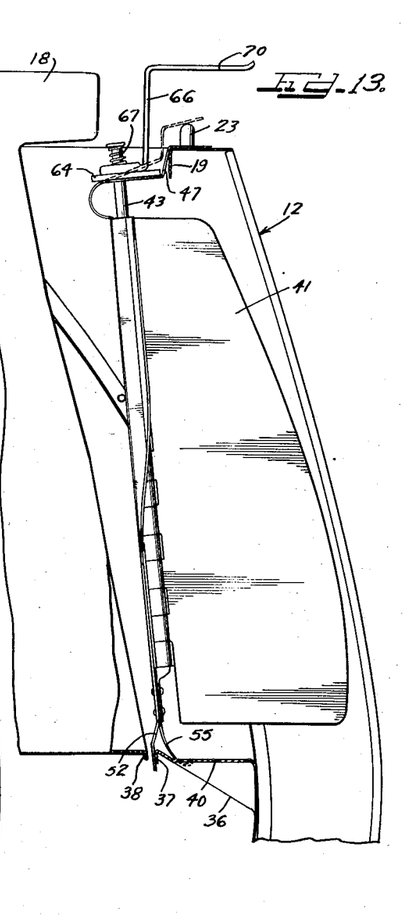

In Figures 11, 12, and 13 of the drawings I have illustrated how the air baffle structure may be inserted through the relatively small openings between header 18 of radiator 11 and grille 12 when the hood 13 is in its raised position. Referring first to Figures 11 and 12 the air baffle structure is adjusted so that fins 41 and 42 are in their open position (that is close together) and the baffle unit is inserted through the opening at substantially right angles to its normal position. It is then lowered while still maintained in this relative angular position until the lower lip 52 is disposed just above lip 37 of flange 36 and lip 38 of radiator 11. It is then rotated through substantially 90° (in a counter-clockwise direction as viewed in Figure 12) thus permitting downwardly extending flange 52 to settle down into channel 39 and fingers 55 and 56 to settle down on opposite sides of ridge 40 of flange 36, as is shown in Figure 13. Upper arm 47 being made of spring material is then swung over locking stud 23. Operating handle 66 of cam 64 is now raised against the resilient action of spring 67 and rotated through substantially 180°, thus disposing end portion 70 of handle 66 over header 18 of radiator 11 as is illustrated in Figure 1 of the drawings. The air baffle structure is now in desired position ready for operation.

From the above description it will be apparent that I have provided an extraordinarily simple method of and apparatus for controlling the flow of air to radiators. Notwithstanding the economical design of the air baffle structure, the equipment is scientifically designed to comply with the cooling requirements of radiators. It will further be appreciated that due to the inherent nature of the construction the pressure of the air against the baffle plates or fins is always such as to press them tighter against their structure abutments (that is the walls of channel 45 of stationary member 44). This tends to augment the spring pressure of the baffle plate biasing spring and thus further reduce any possibility of vibration or chattering of the baffle plate or fin members.

While I have shown particular embodiments of my invention, it will of course be understood that I do not wish to be limited thereto, since many modifications may be made, and I therefore contemplate by the appended claims to cover all such modifications as fall within the true spirit and scope of my invention.

I claim as my invention:

1. As an article of manufacture, a shutter for disposition in front of a radiator including a single pair of angularly arranged fins adapted to be converged and diverged, said shutter having means thereon for detachably securing it between a vehicle radiator and a radiator grille.

2. As an article of manufacture, a removable radiator accessory including means thereon for detachably and resiliently supporting it between a vehicle radiator and an ornamental radiator grille, said accessory including movable baffle means adapted to regulate the flow of air to said radiator.

3. In combination with a vehicle radiator, a radiator accessory including shutters tensioned to move to their closed position, abutments limiting such movement, said shutters and said abutments being so positioned that the inrushing air tends to push said shutters into tighter engagement with said abutments.

4. In combination with a vehicle radiator and a radiator grille, said radiator and radiator grille being so disposed that there is a relatively small opening between the two at the top, a vertical air baffle deflector for disposition between said radiator and grille adapted to be mounted therebetween by collapsing and inserting same through said opening.

5. In combination with a vehicle radiator and a radiator grille, said radiator and radiator grille being so disposed that there is a relatively small opening between the two at the top, a vertical air baffle deflector for disposition between said radiator and grille adapted to be mounted therebetween by collapsing and inserting same through said opening, said baffle being adapted to regulate the flow of air to said radiator.

6. In combination with a vehicle radiator and a radiator grille, said radiator and radiator grille being so disposed that there is a relatively small opening between the two at the top, a vertical air baffle deflector for disposition between said radiator and grille adapted to be mounted therebetween by collapsing and inserting same through said opening, said baffle including a pair of diverging fins, and means for regulating the relative angular position of said fins, thereby to control the flow of air to said radiator.

7. For use with an automotive vehicle having a radiator, a radiator grille spaced from said radiator, and an engine hood adapted to be raised and lowered to afford access to an interior portion of said vehicle to the rear of said radiator and to the space between said radiator and said grille, and as an article of manufacture, a unit baffle structure adapted to be removably mounted between said radiator and said grille through the opening afforded by the raising of said hood.

8. For use with an automobile vehicle having a radiator, a radiator grille spaced from said radiator, and an engine hood adapted to be raised and lowered to afford access to an interior portion of said vehicle to the rear of said radiator and to the space between said radiator and said grille, and as an article of manufacture, a unit baffle structure adapted to be removably mounted between said radiator and said grille through the opening afforded by the raising of said hood, said unit baffle structure being held in desired position upon the closure and by said hood.

9. Apparatus for decreasing the cooling of a radiator by an on-rushing stream of cooling medium which includes a truncated heart-shaped barrier interposed in the path of the stream of cooling medium, the lower portion of said barrier being of greater width than the upper portion of said barrier, said barrier comprising two halves hinged together and foldable along an upright axis.

10. The combination comprising a stationary member, two members mounted for relative angular movement about an upright axis, and means for effecting relatively angular movement of said members including means for angularly shifting the axis of said movement with respect to said stationary member.

11. The combination comprising a stationary member, two members mounted for relative angular movement about an upright axis, and means responsive to an angular shifting of the axis of movement of said two members for effecting an angular movement therebetween.

12. An air baffle structure comprising a channel member, a rod having a portion extending up through the channel of said member, a pair of fins rotatably mounted on said rod, each fin engaging and resting on an outer edge of said channel member, means tending to increase the angle between said fins, and means for causing said rod to move in and out of said channel member, thereby to control the angle between said fins.

13. With an automobile construction including a cooling radiator and an ornamental grille spaced therefrom, said grille including a horizontally rearwardly disposed flange extending into close proximity to the base of said radiator but leaving a channel therebetween, said flange including a hill-like portion forming a ridge which is perpendicular to the front face of said radiator, the combination comprising an adjustable air baffle structure for disposition between said radiator and said grille having a downwardly disposed arm extending into locking engagement in the channel between said radiator and said flange.

14. With an automobile construction including a cooling radiator and an ornamental grille spaced therefrom, said grille including a horizontally rearwardly disposed flange extending into close proximity to the base of said radiator but leaving a channel therebetween, said flange including a hill-like portion forming a ridge which extends perpendicular to the front face of said radiator, the combination comprising an adjustable and removable air baffle structure for disposition between said radiator and said grille having a downwardly disposed lip extending into snug engagement with said radiator and said grille in said channel and releasable means for securing the top of said structure to the body of said vehicle.

15. With an automobile construction including a cooling radiator and an ornamental grille spaced therefrom, said grille including a horizontally rearwardly disposed flange extending into close proximity to the base of said radiator and leaving channel therebetween, said flange including a hill-like portion forming a ridge which extends perpendicular to the front face of said radiator, the combination comprising an adjustable air baffle structure for disposition between said radiator and said grille having a downwardly disposed lip adapted to fit into said channel and a pair of resilient fingers extending into engagement with said flange on either side of said ridge, and means for detachably securing the top of said structure to the body of said vehicle.

16. With an automobile construction including a cooling radiator and an ornamental grille spaced therefrom, said grille including a horizontally rearwardly disposed flange extending into close proximity to the base of said radiator but leaving a channel therebetween, said flange including a hill-like portion forming a ridge which extends forwardly from the front face of said radiator, the combination comprising an adjustable air baffle structure for disposition between said radiator and said grille having a downwardly disposed lip adapted to extend into said channel and a pair of resilient fingers extending into engagement with said flange on either side of said ridge, and means for pressing and holding said structure downwardly against the resilient action of said fingers.

17. With an automobile construction including a cooling radiator, an ornamental grille spaced therefrom, a raisable engine hood, the front portion of which extends over the space between said radiator and said grille, and an upright locking stud on said construction adapted to engage said hood to hold it in its closed position, said grille including a horizontally rearwardly disposed flange extending into close proximity to the base of said radiator but leaving a channel therebetween, the combination comprising an adjustable air baffle structure for disposition between said radiator and said grille having a downwardly disposed arm extending into engagement with said radiator and said grille in said channel and also having an upwardly disposed arm adapted to extend into engagement with said stud.

18. With an automobile construction including a cooling radiator, an ornamental grille spaced therefrom, a raisable engine hood, the front portion of which extends over the space between said radiator and said grille, and an upright locking stud on said construction adapted to engage said hood to hold it in its closed position, the combination comprising an adjustable air baffle structure for disposition between said radiator and said grille having a downwardly disposed member extending into horizontally locked position with the lower part of said grille and an upwardly extending arm with a substantially horizontally extending lip portion having an aperture therein adapted to receive such stud, whereby when said hood is lowered and locked in said stud said air baffle structure is firmly and securely held in desired position to said hood.

19. The combination comprising a channel member, a pintle disposed within the channel of said member, a pair of fins rotatably mounted on said pintle, biasing means tending to increase the angle between said fins, thereby causing said fins to abut constantly opposite edges of said channel member, and means for varying the relative depth at which said pintle is disposed within said channel, thereby to control the relative angular position of said fins.

20. The combination comprising a stationary member having a portion thereof shaped to define a channel, a pintle having one end secured to said stationary member and having a portion thereof extending through said channel, said stationary member also including a flange portion at substantially a right angle to said pintle and having a longitudinal slot therein through which the free end of said pintle extends, a pair of fins rotatably mounted on said pintle, biasing means tending to increase the angle between said fins, thereby causing said fins to abut constantly opposite edges of said channel, and cam operating means for determining the position of said pintle in said slot thereby to control the relative angular position of said fins.

21. The combination comprising a stationary member having a portion thereof shaped to define a channel, a pintle having one end secured to said stationary member and having a portion thereof extending through said channel, said stationary member also having a flange portion at substantially right angles to said pintle and having a longitudinal slot extending perpendicular to the base of said channel through which the free end of said pintle extends, a pair of baffle plates rotatably mounted on said pintle, biasing means tending to increase the angle between said baffle plates, thereby causing said baffle plates to abut constantly opposite edges of said channel, an eccentrically mounted substantially rectangular cam rotatably mounted on said pintle in proximity to its free ends, a cam abutment member on said stationary member, and means for rotating said cam thereby to vary the relative position of said pintle in said longitudinal slot whereby the relative angular position of said baffle plate is determined.

22. In a vehicle assembly including a radiator, a radiator grille having an intermediate portion spaced from said radiator thereby to form a space between said radiator and said grille accessible through a relatively small opening at the top, and an air baffle unit for disposition in said space, said baffle unit including a pair of fins pivotally mounted on a pintle and a downwardly extending lip adapted to be disposed in a transverse channel in proximity to the base of said radiator, the method of assembling said unit in said space between said radiator and said grille which includes arranging said fins close together in substantial parallelism with each other, lowering said unit through said top opening with said fins disposed in a plane substantially parallel to the plane of the face of the radiator, rotating said unit through approximately 90° when said lip is immediately above said channel, and finally further lowering said unit to permit said lip to be disposed within said channel.

23. An air baffle unit comprising a stationary member having a longitudinal channel portion extending a substantial distance along said member, a pintle disposed within said channel having one end pivotally mounted to said stationary member to permit movement of said pintle in and out of said channel, a pair of baffle plates rotatably mounted on said pintle, biasing means for diverging said baffle plates, thereby causing said plates to abut opposite edges of said channel portion, and means for adjusting the spacing between said pintle and the bottom of said channel portion.

24. An air baffle unit comprising a stationary member having a longitudinal channel portion extending a substantial distance along said member, a pintle disposed within said channel having one end pivotally mounted to said stationary member to permit movement of said pintle in and out of said channel, the opposite end of said pintle being bent at a substantial angle to the longitudinal axis of said pintle, an aperture in said stationary member through which said bent end of said pintle extends, a pair of baffle plates rotatably mounted on said pintle, biasing means for diverging said baffle plates, thereby causing said plates to abut opposite edges of said channel portion, and means for adjustably clamping said bent end of said pintle to said stationary member.

25. An air baffle unit comprising a stationary member a longitudinal channel portion extending a substantial distance along said member, a pintle disposed within said channel having one end secured to said stationary member, the opposite end of said pintle being bent at a substantial angle to the longitudinal axis of said pintle, an aperture in said stationary member through which said bent end of said pintle extends, said pintle being slightly flexible to permit movement of said bent end of said pintle in and out of said aperture, a pair of baffle plates rotatably mounted on said pintle, biasing means for diverging said baffle plates, thereby causing said plates to abut opposite edges of said channel portion, and means for adjustably clamping said bent end of said pintle to said stationary member thereby to permit control of the relative angular position of said baffle plates.

26. A shielding device for the radiator of an automobile having an opening at the front through which air is directed to the radiator and a grille for said opening, comprising a radiator shell extending forwardly from the radiator to said opening, two control members located in said radiator shell at the rear of the grille, one controlling one half of the opening and the other controlling the other half of the opening, and means for moving said members to different positions back into said radiator shell, to vary the size of said opening.

27. A shielding device for the radiator of an automobile having an opening at the front through which air is directed to the radiator and a grille for said opening, comprising a radiator shell extending forwardly from the radiator to said opening, two control members at the rear of the grille, one controlling one half of the opening and the other controlling the other half of the opening, and means for moving said members back into said radiator shell to different positions at the rear of said grille, to vary the size of said opening, said members being pivotally mounted in position.

28. As an article of manufacture, a generally V-shaped radiator shutter arranged to be disposed between a vehicle radiator and a grille which extends forwardly relative to the radiator, said radiator shutter being foldable along a substantially vertical axis and arranged to cover a substantial portion of the vehicle radiator when in its unfolded position, and arranged in its folded position to present a vertical fin which extends substantially perpendicular to the plane of said radiator between the radiator and the grille, said shutter being of width and length sufficient for obstructing passage of light laterally through the grille when in one of said positions.

29. Apparatus for controlling the cooling of a radiator by an on-rushing stream of cooling medium which includes baffle means comprising a foldable truncated heart-shaped barrier which is arranged to be disposed in the path of a stream of cooling medium, and means for folding and unfolding said foldable heart-shaped barrier, said barrier in its unfolded position being substantially parallel to the plane of the face of said radiator.

30. A shielding device for the radiator of an automobile having an opening at the front through which air is directed to the radiator and a grille for said opening, comprising a radiator shell extending forwardly from the radiator to said opening, two control members at the rear of the grille, means for moving said members away from said grille to different positions back of said grille, to vary the size of said opening, said members being pivotally mounted in position, a receiving chamber between said grille and said radiator into which said control members are moved when moved to various pivoted positions.

31. In a device of the character described, the combination with motor vehicle radiator and grille members, the grille extending forwardly relative to the radiator, of wing flaps hingedly mounted on one of said members for regulating the supply of air to the radiator through the grille, said wing flaps being of width and length sufficient for obstructing passage of light rays laterally through the grille in at least one hinged position of the wing flaps.

32. In combination with a motor vehicle engine and radiator hood and a false front for said hood comprising a grille extending forwardly relative to the radiator, supporting means in said grille, wings pivotally mounted on said supporting means, said wings being of sufficient width and length to obstruct the passage of light laterally through said false front, and means for selectively opening and closing said wings relative to said grille for controlling passage of air to the radiator.

GEORGE ALBERT LYON.